UNITED STATES PATENT OFFICE.

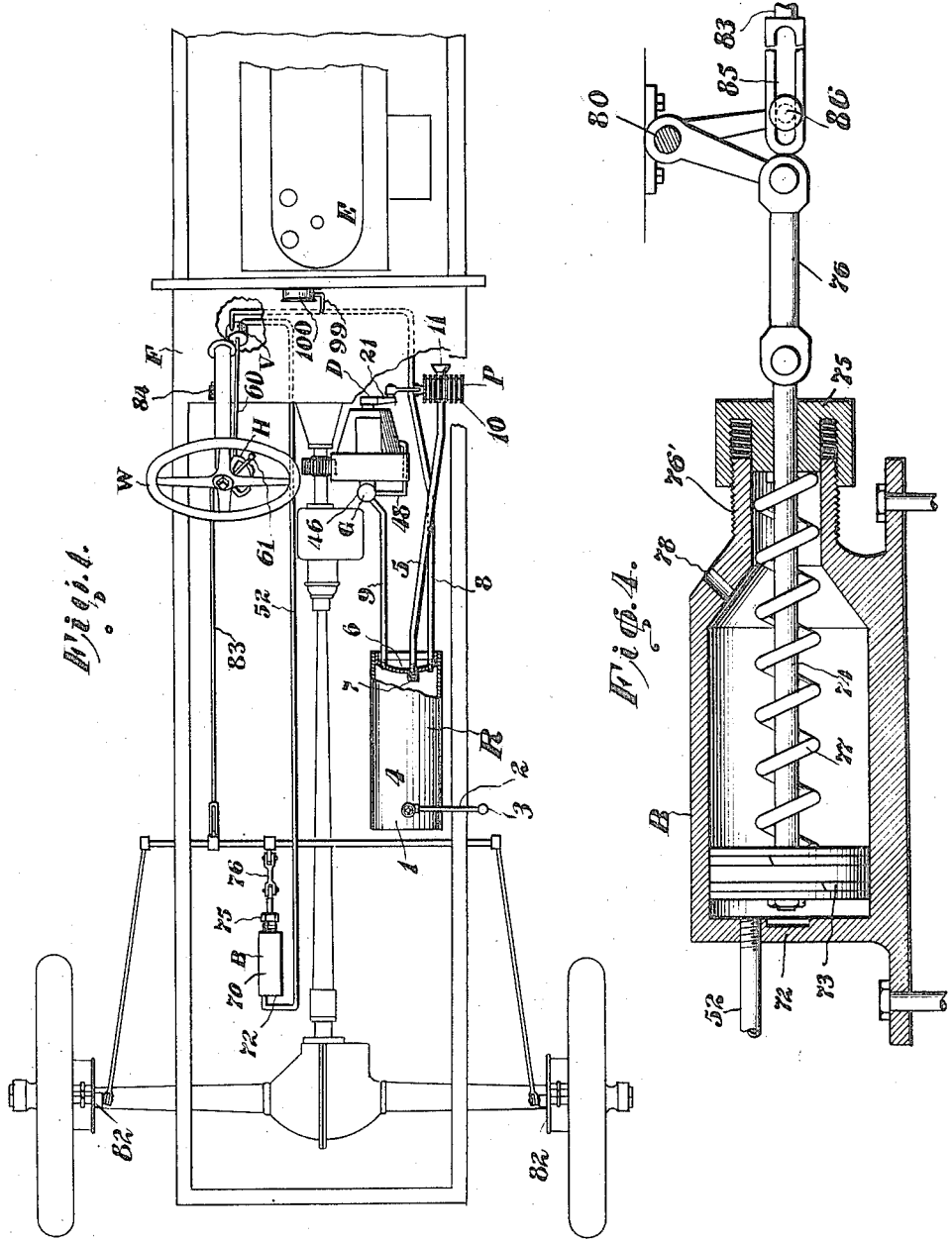

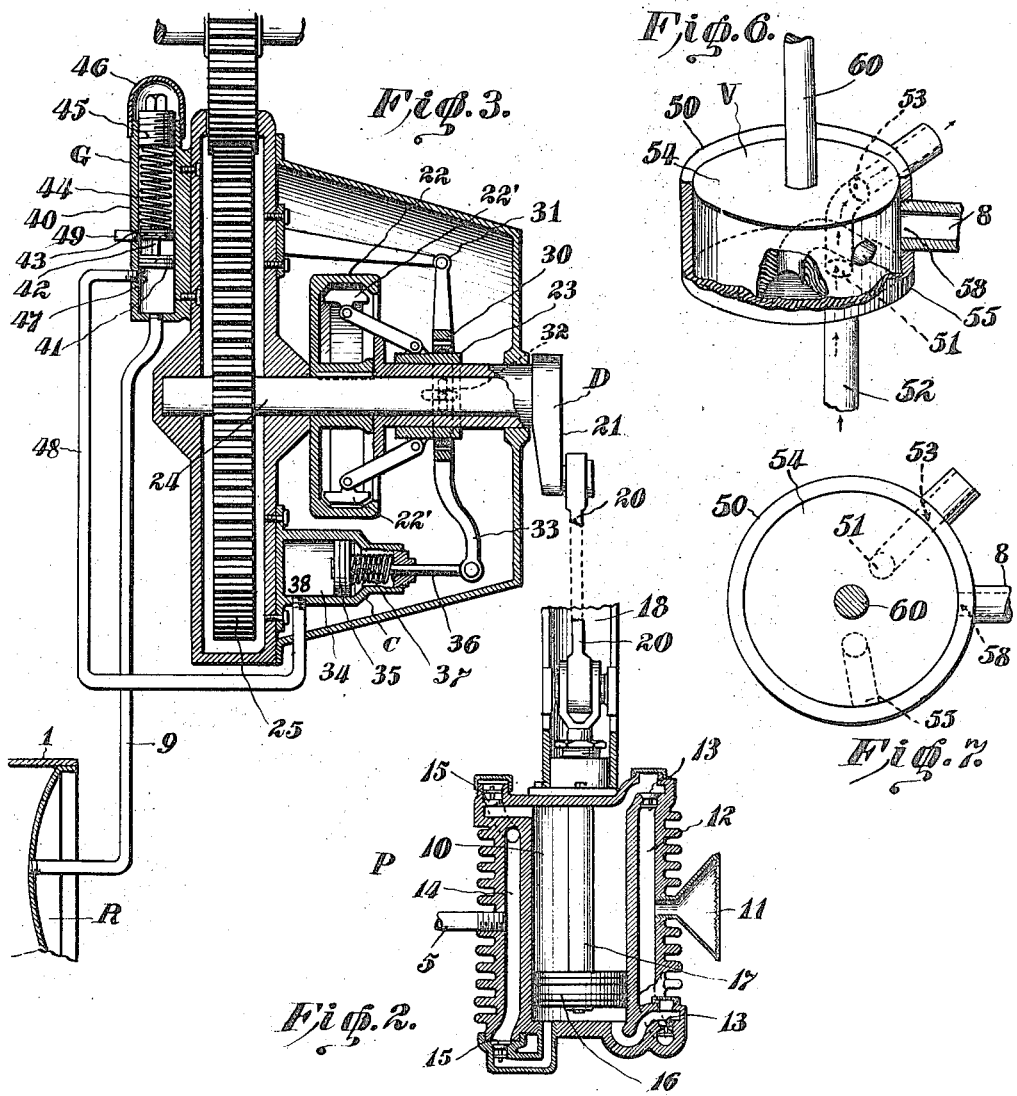

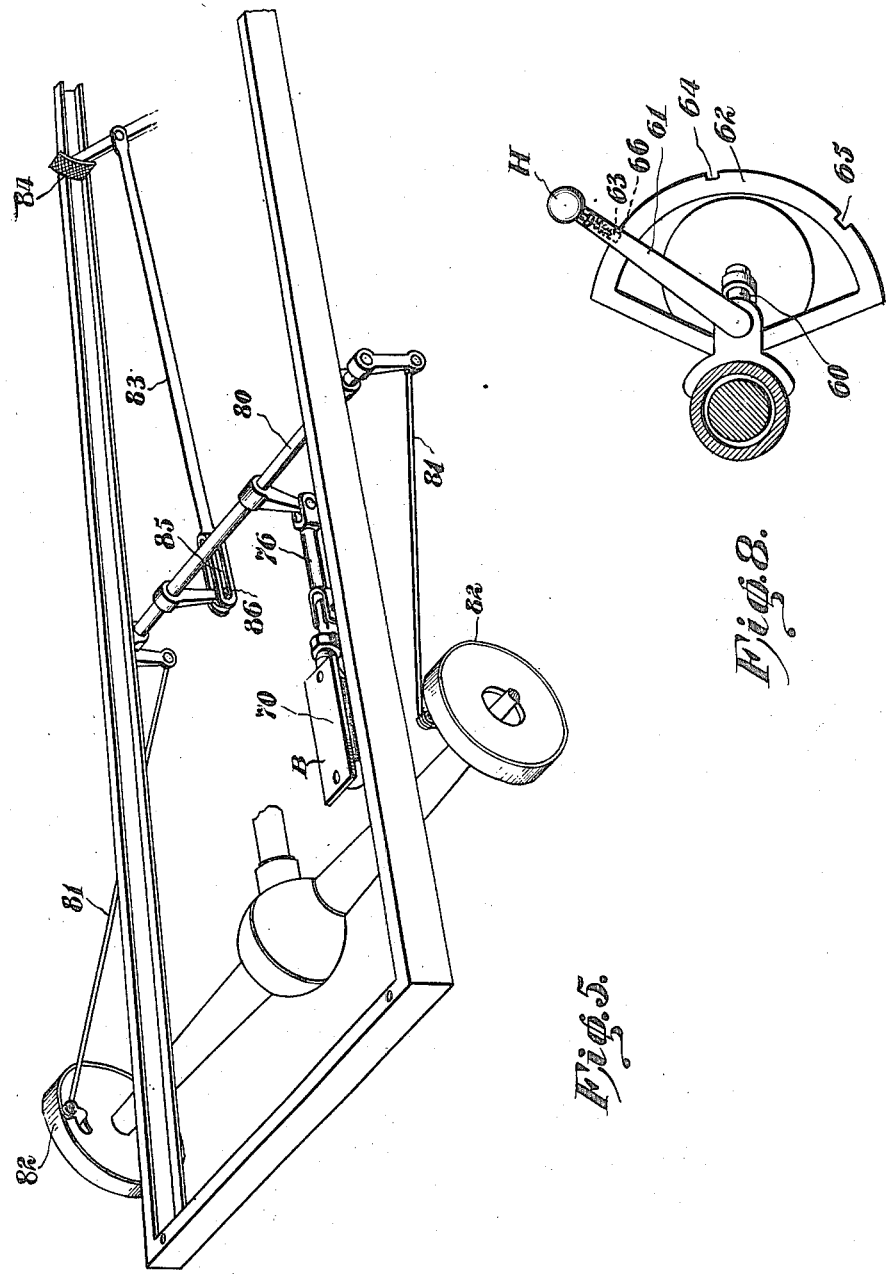

WILEY EUGENE DANIEL, OF DE LEON, TEXAS, ASSIGNOR OF ONE-HALF TO LOY HILL, OF SMITHVILLE, TEXAS.

AIR-BRAKE FOR AUTOMOBILES.

1,283,097.             Specification of Letters Patent.        Patented Oct. 29, 1918.

Application filed February 27, 1917. Serial No. 151,287.

*To all whom it may concern:*

Be it known that I, WILEY E. DANIEL, a citizen of the United States, residing at De Leon, in the county of Comanche and State of Texas, have invented new and useful Improvements in Air-Brakes for Automobiles, of which the following is a specification.

This invention relates to fluid pressure brakes, and more especially to governors for the air pumps thereof; and the general object of the same is to produce an air brake system for application to automobiles and wherein pressure in the air tank or reservoir is maintained by means of a pump whose driving mechanism is connected with the engine shaft and is cut out automatically by a governor which is actuated when the pressure exceeds a certain limit.

The invention consists specifically in the mechanism for carrying out this general idea, all as hereinafter more fully described and claimed, and as shown in the drawings wherein:—

Figure 1 is a general diagrammatic view showing the several instrumentalities or mechanisms composing this system and their preferred arrangement on the frame of an automobile with relation to its engine, its steering pillar, and its brakes.

Fig. 2 is an enlarged sectional detail of the air pump, and

Fig. 3 a similar detail of the driving mechanism therefor, the control for this mechanism, and the governor for actuating the control.

Fig. 4 is a sectional detail of the brake cylinder, and

Fig. 5 a perspective detail showing its arrangement in connection with the brake beam, the brakes, and the foot lever for independently setting the brakes.

Figs. 6 and 7 are details of the driver's brake valve, and

Fig. 8 is a detail of the hand control therefor.

Broadly speaking this system comprises an air reservoir R in which pressure is maintained by means of a reciprocating pump P whose driving mechanism D is geared to the engine shaft E and contains a clutch, and the opening and closing of this clutch is actuated by a control mechanism C which is preferably moved in one direction by a spring and in the opposite direction by a governor G, the latter being actuated by pressure within the reservoir R. Air under pressure from the latter is led to a valve V corresponding somewhat in nature to the "engineer's valve" in a railway air-brake system, and this valve is moved by a hand control or handle H preferably mounted on the steering pillar just beneath the steering wheel W or at least adjacent to same so that it is within reach of the driver's hand. These various mechanisms are shown in their associated relation and in diagram in Fig. 1, and the details of their preferred structure in other views, and I will first describe my preferred construction of a mechanism or element and then their associated relation and the operation of the system.

The reservoir R may well be a sheet metal tank having a cylindrical body 1 supported horizontally beneath or within the frame of the automobile and not so close to the muffler or the exhaust pipe that it will be unduly heated. At a proper point I provide it with a section 2 of hose carrying an Acorn coupling 3 at its outer end for attachment to the nipple of any tire, and a valve 4 is present so that air may be taken from the reservoir for inflating a deflated tire. This detail is explained simply to show that other uses may be made of the compressed air than for actuating the brake. I might suggest also that, if the engine were provided with a starter driven by air, the motive fluid for the starter could be taken from this reservoir without injury to my brake system as will appear below. The supply pipe 5 for air leads preferably into one head 6 of the reservoir R, and is provided with a check-valve 7, and the outlet pipe 8 may also lead from a point in the same head to the driver's valve V, while another and preferably smaller pipe 9 leads from the reservoir to the governor G for a purpose yet to appear. The details thus far described are so simple that I have illustrated them in Fig. 1.

The pump P for maintaining pressure within the reservoir R may be of any suitable type, but I preferably employ a reciprocating pump as best seen in Fig. 2. This has an upright cylindrical body 10 with a screened inlet 11 communicating with a channel 12 separated from the cylindrical body by two inlet valves 13 at opposite ends thereof, and at the opposite side of the body is a second channel 14 communicating at its center with the pipe 5 and at its ends with outlet valves 15 at the ends of the body as shown. Within the cylinder reciprocates a piston head 16, suitably packed, and this head is mounted on a rod 17 extending through one end of the cylinder and suitably packed within a sleeve 18. With this construction, when the head 16 is reciprocated air is pumped along the supply pipe 5 through the check-valve 7 into the reservoir R.

The driving mechanism for the pump is shown at D in Fig. 3. This mechanism comprises a pitman rod 20, which connects the piston rod 17 with the crank 21 of a tubular shaft. A collar 23 is mounted on this shaft for sliding movement, and is connected with one element, as shoes 22' of a clutch. The other clutch element here shown as a rim 22, is keyed or otherwise secured to a shaft 24, rotatably mounted in the tubular shaft, and which shaft 24 is continuously driven by gearing 25 from the engine. We need not go into further detail as to the construction of the clutch, as any suitable form of clutch may be employed; but it is essential to my invention that the driving mechanism D for the pump P shall be actuated by some constantly moving part of the engine and shall include a clutch mechanism so that this driving mechanism may be thrown out of action by a control next to be described. When not so thrown out of action it will be clear that the running of the engine imparts movement to the pump, and therefore replenishes the air pressure within the reservoir R.

The control C for said driving mechanism is herein shown as a loop or yoke 30 pivoted at one end at 31 to a bracket or other fixed support, having suitable connection such as slot and pins at 32 with the collar 23, and provided at the other side of said collar with an arm 33, so that movement of this arm in one direction or the other will engage or disengage the clutch. Within a cylinder 34 moves a piston head 35 whose stem 36 passes through an expansive spring 37 and is pivotally connected with the arm 33, and the expansion of such spring normally moves the head and stem so as to swing the yoke 30 in a direction which engages the clutch and sets the driving mechanism D in action. Therefore the normal tendency of this control C is to permit the pump P to run and replenish the air in the reservoir R. The control is moved or actuated to overcome its normal tendency, by the governor next to be described.

The pressure governor G includes an upright cylindrical body 40 whose lower end is closed, and through this end opens the small pipe 9 from the reservoir R. Within the cylinder moves a piston head 41 from which rises a stem 42 bearing a second head 43, and on the latter is disposed a coiled expansive spring 44 whose upper end rests against a plug 45 screwed into the upper end of the body 40 and covered with a cap 46. By moving the latter and adjusting the plug, it is obvious that the tension of the spring 44 may be increased or diminished. Its tendency is always to depress the two heads which move as one within the body, but excessive pressure from the reservoir R passing through the pipe 9 will raise the piston against the tension of such spring as is clear. From a point 47 in one side of the cylinder 40 a pipe 48 leads to a point 38 at one end of the cylinder 34 of the control C, and when the pressure beneath the head 41 is sufficient to raise it above the point 47, air flows out that point and along the outlet pipe 48 into the control and actuates the latter to disengage the clutch and stop the motion of the pump. To permit the rise and fall of the piston head 41 within the cylinder, the latter is provided with an exhaust 49 at some distance above the point 47; and if the pressure within the reservoir should become sufficient to raise the piston head 41 so high that this point is uncovered, the very excessive pressure simply exhausts there and no harm is done. The pump-driving mechanism D, its control C, and the pressure governor G are illustrated in their connected relation in Fig. 3.

The driver's valve V is best seen in Figs. 6 and 7. It comprises a cylindrical casing or shell 50 which is preferably carried beneath the floor F at the lower end of the steering pillar as shown in Fig. 1, and a rotary head or block within the same. The outlet pipe 8 from the reservoir R communicates with an inlet port 58 at one side of the shell. At another point in the shell is a port 51 communicating with a pipe 52 which leads to the brake cylinder B of Fig. 4. At still another point in the shell is an exhaust port 53 which leads to the open air. The rotary valve head or plug 54 mounted within the shell 50 is provided with a passage 55 which is so shaped and disposed therein that its extremities may be thrown into simultaneous communication with the inlet and outlet ports 58 and 51 to permit air from the outlet pipe 8 from the reservoir to pass to the inlet pipe 52 of the brake cylinder, or by turning this plug the passage may be made to establish communication between the brake cylinder pipe 52 and the exhaust port 53 to permit the air in the brake cylinder to exhaust, while cutting off the air from the reservoir. Therefore the plug 54 of this valve V is such that in one position it connects the reservoir R with the brake cylinder B and closes the exhaust port 53, and in another position it closes communication from the reservoir and establishes communication from the brake cylinder to the exhaust 53.

The control or handle H for setting the driver's valve V is shown in Fig. 1 as mounted on the steering pillar adjacent to the steering wheel W, and its details are best seen in Fig. 8. Rising from the center of the plug 54 through the pillar is a rod or shaft 60 whose upper end is connected with a control lever 61 which moves over a sector 62, and the lever may have a thumb latch 63 which is spring-pressed so as to drop into notches in the sector as usual. One notch 64 is for holding the valve V set in what is called the "holding" position, another notch 65 holds the brakes set, and another notch 66 holds the brakes released— all as is usual on engineer's valves in railway air brakes, and as well understood by those familiar with this art. While I have shown the control lever 61 as beneath the wheel W, it might be superimposed thereover so as to be within yet more ready reach of the operator's hand; and while I have shown the entire mechanism for actuating the valve V as disposed on the steering pillar and wheel, it is clear that it could be arranged elsewhere, although it should always be within ready reach of the driver's hand.

The brake cylinder B is best seen in Fig. 4. The cylinder itself is numbered 70 and is preferably carried on a bracket 71 which is suitably attached to the automobile chassis or a bar thereon. One end 72 of this cylinder is closed, and through this end the pipe 52 opens into the interior of the cylinder. Therein moves the piston head 73, whose stem 74 passes through packing 75 in the other end 76 of the cylinder, which is preferably screwed on so that it can be removed as illustrated; and the stem is connected by a link 76 with the brake beam. Surrounding the stem within the cylinder is a coiled expansive spring 77 whose tendency is ever to press the head 73 toward the closed end 72 and release the brakes. The cylinder is provided with an exhaust port 78 to permit the head to move in a direction to compress this spring, which it does when air is admitted through the pipe 52. As will be seen in the paragraph below, such movement applies the brakes, whereas the expansion of the spring and the movement of the head 73 in the other direction releases the brakes.

In Fig. 5 is shown an arrangement by means of which the attachment of this air brake system to the brake beam does not interfere with the foot lever by which the driver can apply the brakes independently of the air. Said beam is indicated by the numeral 80, and links or rods 81 connect it with the brake bands 82 as shown diagrammatically, the cylinder is indicated at 70, and the link 76 is connected with the beam 80. From the beam a rod 83 leads forward to the foot lever 84 which, as usual, projects through the floor boards F so that the operator may place his foot thereon; and the rear end of the rod 83 is slotted as at 85 to engage a pin 86 on the beam 80 so that, whatever the position of the foot lever 84, it will not interfere with the action of the air which moves the beam 80 forward when it applies the brakes.

With this air brake system applied to an automobile, the rotation of the engine shaft E through the gears 25 drives the shaft 24, and the spring 37 in the control C normally engages the clutch so that the driving mechanism D is actuated and the piston head 16 within the pump P reciprocates. This takes in air at 11 and delivers it through the supply pipe 5 to the reservoir R, whence the air under compression flows up the pipe 8, and through a branch pipe 99 to a gage 100 located on the dash. Air under compression also flows through the small pipe 9 into the lower end of the cylinder of the pressure governor G, and when the air pressure becomes sufficient to overcome the force of the spring 44 the head 41 rises and permits the air to pass out at the point 47 and along the pipe 48 to the cylinder of the control C. Herein it moves the piston head to compress the spring 37 with the result that the arm 33 disengages the clutch and stops the action of the driving mechanism D and therefore the further pumping action of the pump P. It is obvious that by setting the plug 45 in the top of the governor G, the spring 44 may be put under greater tension so that the driving mechanism is not thrown out of action so soon. But however this is set, when the air pressure within the reservoir R becomes depleted for any reason the spring 44 again moves the piston heads 41 and 43 downward, the former passing the point 47 and throwing the exhaust 49 into communication with the pipe 48. This permits the escape of the air within the control C so that its spring 37 may again expand and engage the clutch, with the result that the driving mechanism D now acts on the pump P and the latter recharges the reservoir.

When the driver desires to apply the brakes by this air system, he moves the lever 61 of the control or handle H so as to rotate the plug 54 within the air valve V. As soon as the passage 55 establishes communication between the pipes 8 and 52, air under pressure flows into the rear end of the brake cylinder B, overcomes the spring 77 therein, and moves the stem 74 and link 76, and as the latter is attached to the brake beam 80, it applies the brakes at 82 to the drums on the wheels as usual. In cases of great emergency the driver may also put his foot on the lever 84 and add his muscular force to that of the air brake system in moving the beam 80 forward and applying the brakes yet more firmly; and, whether the air brake system is used or not, he may apply the brakes by means of this foot lever, or the latter might of course be a hand lever such as is usually known as the service brake lever. Having applied the brakes and retarded or checked the movement of the machine, the driver now throws the control handle or lever 61 to the proper position to turn the valve plug so as to establish communication between the pipe 52 and the exhaust port 53, while cutting off the supply from the pipe 8. This permits the air within the cylinder 70 to exhaust through the valve V, with the result that the spring 77 expands and through the stem 74 and link 76 the beam will be moved in a direction to release the brakes 82 from the brake drums on the wheels.

Thus it will be seen that by the use of air pressure, generated by the running of the engine, the brakes may be applied at will, and when the air is permitted to exhaust the brakes are released. But particular attention is called to the pressure governor G which serves automatically to disengage the clutch and cut out the action of the pump driving mechanism D whenever the pressure within the reservoir R reaches a pre-determined point which is controlled by the setting of the plug 45. Almost no power is required to drive the shaft 24 and the rim 22 of the clutch, and, indeed very little is required to drive the pump; so that whether the clutch is engaged or disengaged there is very little additional load on the engine. Air is free and always obtainable, it does not rust or heat the parts containing it, it cannot explode or burn and does not injure the user in case it leaks, and—as suggested above—it may be used through the hose 2 for pumping up the tires or might be used in an engine starter driven by an air motor. It is possible that a simpler type of air pump could be employed than that herein described and shown, but I consider the use of the governor G almost if not entirely indispensable in this system to prevent overcharging of the reservoir and excessive load on the engine. If the outlet 47 from this governor were connected directly with the point 38 of the control C, then any leakage would actuate the governor to start up the pump when the pressure in the reservoir fell below a given point. I would make this reservoir a tank of ample capacity to contain sufficient air for all ordinary uses, even though the engine should be stopped for some time.

What is claimed as new is:

A pressure system involving an air pump, a reservoir in communication therewith, and driving means for the air pump, said means including a clutch, means actuated by the reservoir pressure for disengaging the clutch, a governor in communication with said means, communicating means between the governor and reservoir, and mechanism within the governor and directly responsive to reservoir pressure to control the admission of such reservoir pressure to the first-mentioned means, said governor having an exhaust to prevent excessive rise in pressure in the reservoir and said first mentioned means.

In testimony whereof I affix my signature.

WILEY EUGENE DANIEL.